Nov. 8, 1949 J. P. CASSIDY 2,487,307
DISPLAY APPARATUS
Filed May 3, 1946 2 Sheets-Sheet 1

INVENTOR
J. P. CASSIDY
By: Fetherstonhaugh & Co.
ATT'YS

Patented Nov. 8, 1949

2,487,307

UNITED STATES PATENT OFFICE 2,487,307

DISPLAY APPARATUS

Joseph Patrick Cassidy, Romford, England

Application May 3, 1946, Serial No. 667,161

3 Claims. (Cl. 272—8)

1

This invention relates to display apparatus, and particularly apparatus for display advertising.

Unique displays form a basis for advertising in a pronounced way and particularly displays which are designed to pique the curiosity of the individual and, therefore, attract particular attention. A number of proposals in this general field have been made but in many cases, in order to obtain a degree of mystification as to the manner in which the display is achieved, it is often necessary to provide substantially complicated apparatus. In other cases, the display is such that the manner in which it is done is partially apparent to the individual which thus detracts from the value of the display and fails to hold the individual's attention to any particular degree.

The present invention relates to an advertising display which is designed to attract attention by its unique character, while avoiding the disadvantages above referred to.

It is, therefore, an object of the present invention to provide an advertising display device which will provide for the unique display of various articles and the change of the display as the individual watches it, while tending to mystify the observer as to the manner in which it is done; thus accentuating the display and rendering it particularly attractive.

A further object of the invention is to provide an apparatus of this kind which is comparatively simple in construction and operation in respect to the functions performed.

A further object of the invention is to provide a display of this kind which will act with precision so as to effect changing of the articles displayed in a predetermined time cycle of the operation of the apparatus, causing articles located in one part of the apparatus to disappear from view and articles located in another part of the apparatus to take the place of the others as such articles or displays are viewed through one viewing opening.

A further object of the invention is to provide an apparatus of this kind through which merchandise of one or more manufacturing houses, distributors or the like may be displayed in a recurring cycle.

A further object of the invention is to provide an apparatus which will be comparatively inexpensive.

With these and other objects in view, the invention generally comprises a cabinet having a viewing opening through which articles to be displayed may be viewed, mountings to display up to four series of articles, two series in one location and two series in another and opposed location, the said two series being disposed in planes at right angles to one another, a transparent plate disposed at an incline to the viewing opening and related to the both series of articles to be displayed whereby in combination with light controlling means, the articles of one series are displayed directly and the articles of the other series are displayed, alternately to those of the first series, by reflection, and disposed in the position of the first series so as to take the place of the latter.

2

The invention will be clearly understood by reference to the following detailed specification taken in conjunction with the accompanying drawings.

Figure 1:
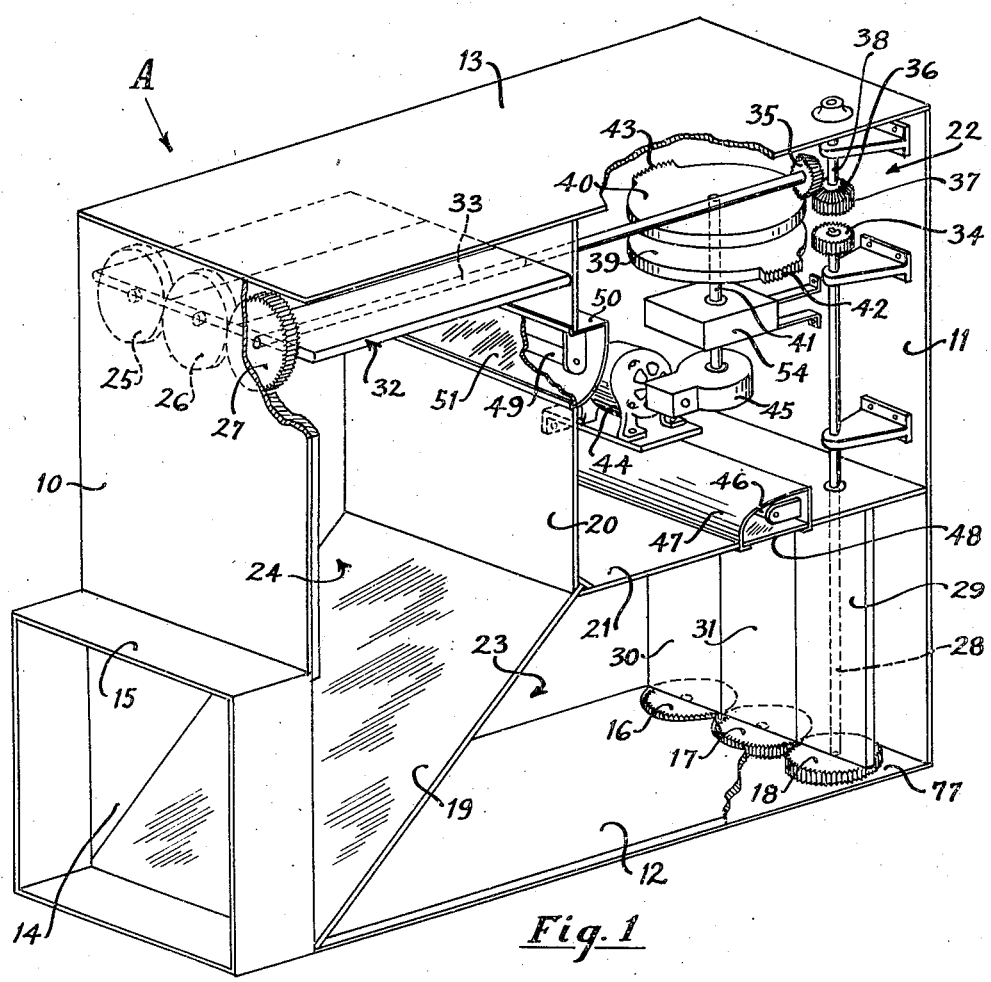
Fig. 1 is a perspective view of a display device constructed according to the present invention, having a side wall and certain parts thereof broken away to illustrate the general arrangement and cooperation of parts.
Figure 2:
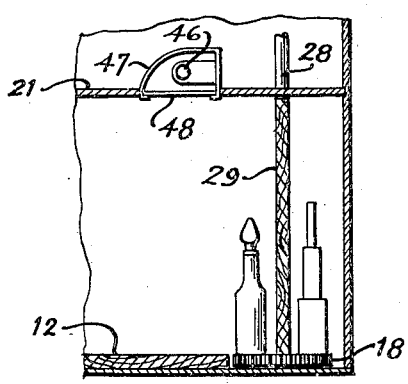
Fig. 2 is an enlarged fragmentary section taken through one of the panels and platforms for displaying articles.

Referring to the drawings, A indicates an advertising display cabinet having a front wall 10, a rear wall 11, base 12 and a top 13. The cabinet is closed on the sides by suitable walls. The front wall of the cabinet is formed with a viewing opening 14, preferably having the forwardly projecting frame 15 and designed to permit objects mounted on rotatable shelves or platforms 16, 17 and 18 to be viewed. These platforms are disposed adjacent to but spaced from the rear wall 11 of the cabinet in line with the viewing opening 14. A pane of transparent material 19, such as glass, is mounted in the cabinet at an angle of 45° to the vertical and horizontal being secured at its upper end to a partition 20 of a subframework formed with base 21, and designed to define a mechanism compartment 22. The pane of transparent material, as will be apparent, will permit one to see the objects mounted on the shelves or plateforms 16, 17 and 18 when these articles are illuminated. However, when the display compartment 23 which houses these shelves or platforms is darkened, the transparent pane will, in effect, become a mirror and can be used to reflect objects in such a way that they will appear to be positioned exactly in the same positions as those mounted on the shelves or platforms 16, 17 and 18.

In order to display objects by reflection in the pane 19, a second display compartment 24 is provided disposed at right angles to the compartment 23. In the upper end of the compartment 24, a series of shelves 25, 26 and 27 are mounted in such a manner as to correspond exactly with the position of the shelves or platforms 16, 17 and 18 or objects carried thereby when shelves 25, 26 and 27 or objects carried thereby are reflected in the pane 19. Thus, by mounting objects on the shelves 25, 26 and 27, they can be displayed through the viewing opening by reflection in the pane 19 in what appears to be exactly the same location as the objects on platforms or shelves 16, 17 and 18. Accordingly, therefore, by suitably controlling the lighting effect, a substitution of one of said series of articles can be made for the others previously displayed through the viewing opening in a manner giving the impression that one set of objects causes the other set of objects to disappear. Moreover, by providing rotatable platforms, two series of articles can be displayed alternately and in their proper cycle from each of the display compartments 23 and 24.

In the present illustration, the platform 18 which takes the form of a disc is mounted on a shaft 28 which may be journalled suitably in the base 12 and carries through into the compartment 22 passing through the base wall thereof 21. A panel 29 is mounted on the platform 18 in a manner to bisect the center line of the platform and extend vertically upwardly therefrom at right angles. This, therefore, provides two display shelves for the platform divided by the panel 29. Accordingly, therefore, an article may be displayed on one side of the panel and another article on the other, both carried by the platform 18. Moreover, by forming each of the platforms with gear teeth, meshing with one another, panel 29 can be reversed and panels 30 and 31, mounted in connection with the platforms 16 and 17, will likewise be reversed upon rotation of the shaft 28, thereby displaying within the compartment 23 articles carried on the platforms 16, 17 and 18 and disposed on the opposite side of the panels 29 to 31.

An exactly similar arrangement is provided in connection with the shelves or platforms 25, 26 and 27 which include division panels which may be generally indicated by the numeral 32. Consequently, two series of articles can be displayed from the shelves 25, 26 and 27 by reversing the shelves at appropriate times in order to display within the compartment 24 the objects carried thereby on the opposite side of the panels 32. The platform 27 is designed to be connected with the operating shaft 33 which passes through the wall 20 of the compartment 22 into the latter compartment. The shafts 28 and 33 are rotated alternately in proper time cycle to effect the change of display desired, as will be apparent hereinafter, and all the platforms of each series are rotated by the gear teeth of the platforms which mesh with one another. In this connection, by means of suitable pins projecting from the platforms 16 and 17 and 25 and 26 and also projecting from the opposite ends of their panels, these platforms are rotatably mounted in the cabinet in a simple manner.

The shafts 28 and 33 terminate within the compartment 22 preferably adjacent one another and carry the gears 34 and 35 respectively. The gear 35 is a bevel gear designed to be operated by the bevelled teeth 36 of a gear 37 carried on the stub shaft 38. The gear 34 and the gear 37 are disposed in spaced parallel relation to one another and in turn are rotated intermittently by means of the gear elements 39 and 40 respectively which are carried on the driven shaft 41. The gear elements 39 and 40 are formed with toothed quadrants 42 and 43 disposed in opposed relation one to the other as shown in Fig. 1, these quadrants forming the means of causing intermittent and partial rotation of the gears 34 and 37.

The shaft 41 is driven initially from the motor 44 which is connected with the shaft 41 by means of reducing gears carried in the reduction box 45. The gear reduction drive is such that the gear elements 39 and 40 make one complete revolution in sixty seconds. Therefore, the gear 37 will be rotated by the quadrant 43 once in sixty seconds. Likewise, the gear 34 will be rotated every sixty seconds by the quadrant 42, except that the rotation of the gear 34 will be effected thirty seconds apart from the rotation of the gear 37.

In other words, when the quadrant 42 causes rotation of the gear 34, the panels 29, 30 and 31 are reversed via the intermeshing gears of their platforms 16, 17 and 18 and they will remain in this reversed position for substantially one complete minute. In the meantime, i. e. half a minute after their reversal, the quadrant 43 will cause reversal of the panels 32 of the platforms 25, 26 and 27 by rotation of the gear 37 and consequent rotation of gear 25 which causes shaft 33 to rotate. The reversal of panels 32 in this sequence is effected in coordination with lighting facilities so that the display in connection with the panels 32 may be shown alternately to the display used in connection with panels 29 to 31, as will be made apparent hereinafter.

The display compartment 23 is designed to be illuminated by a suitable lamp such as the elongated tubular lamp 46 carried in suitable reflecting housing 47 opening into the compartment 23, the opening being preferably closed by a transparent pane 48. This serves fully to illuminate the compartment 23 when the lamp 46 is at full intensity. Similarly, the compartment 24 is illuminated by the lamp 49 housed in the reflector housing 50 which opens into the compartment 24 and is closed by the pane 51. The lamps are designed to be connected in a circuit and coordinated with the operation of the mechanical part of the apparatus so that the lamps are alternately illuminated to full intensity and are gradually dimmed between full intensity illuminations, and alternately shut off to create an optical illusion and change in display from one specific display to another with a partial blending of the displays in between.

Figure 5:
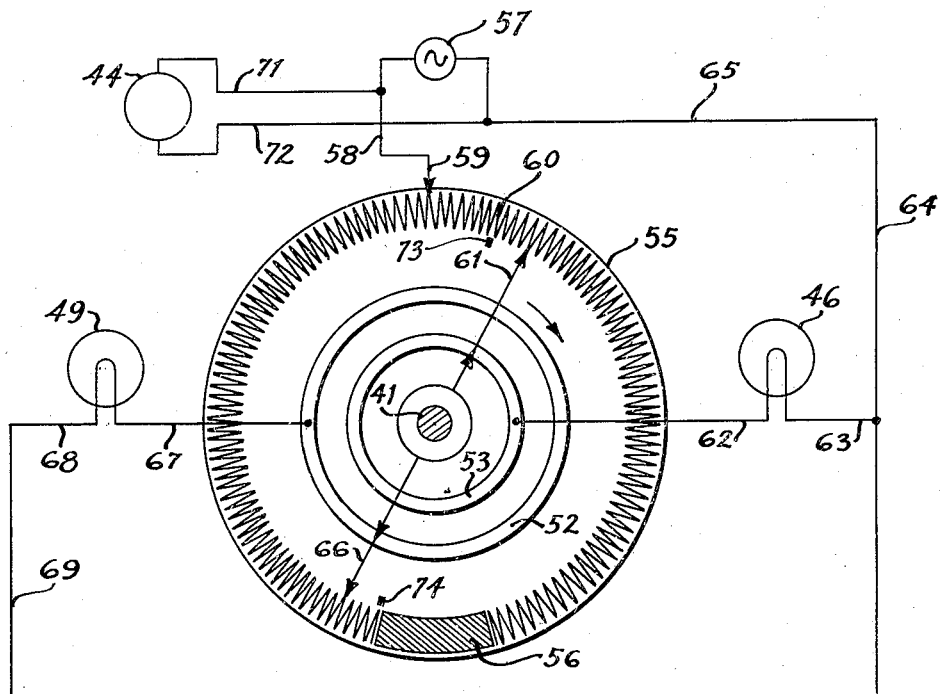
Fig. 5 is a wiring diagram of the electrical part of the apparatus.

The circuit for the lamps is shown in Fig. 5. This embodies the commutator rings 52 and 53 mounted concentrically to the shaft 41 and, the circuit controlling elements, including the commutators 52 and 53, are conveniently housed within a casing 54 through which the shaft 41 passes, as shown clearly in Fig. 1.

Mounted concentrically to the commutator rings 52 and 53 is an illumination control ring 55 in the form of a resistance which is interrupted by the neutral segment 56. From a suitable power source 57, power is supplied through the lead 58 and tapping lead 59 to the resistance 60 of ring 55 and flows through the commutator arm 61 as it rotates in conjunction with shaft 41 passing to the commutator ring 53 which is also contacted by the commutator arm 61, current passing by way of the lead 62 from the ring 53 through the lamp 46 and then by way of leads 63, 64 and 65 to the power source 57. The lamp 49 is illuminated from the power source through the resistance 60, commutator arm 66, commutator ring 52 and from the ring 52 through the lead 67, then through lamp 49 from which it flows via the leads 68, 69, 70, 64 and 65 back to the source. If desired, by way of leads 71 and 72 the motor 44 may be operated from the same source 57 of electrical power.

When a small amount of resistance is included in either of the lamp circuits, the lamp will be illuminated to full intensity. By including a greater amount of resistance in the circuit, either lamp may be gradually dimmed and the arrangement is such that the lamps will vary in intensity, one to the other, reaching a common dimmed intensity at an intermediate stage of operation between maximum intensity, in the case of one light, and no illumination in the other. For instance, upon considering the wiring diagram, it will be noted that the commutator arm 61 has moved with the rotation of the shaft 41 so that a small amount of the resistance 60 is included in the circuit with it. In other words, when the commutator arm 61 contacts the resistance diametrically opposite to the lead 59, lamp 46 will be illuminated with maximum intensity and by reason of the fact that commutator arm 66 is diametrically opposite arm 61, the commutator arm 66 will make contact with the neutral segment 56 as arm 61 is diametrically opposite lead 59. Therefore, lamp 49 will not be illuminated when lamp 46 is at its maximum intensity. Moreover, when the commutator arm 61 has reached the point indicated by the numeral 73, lamp 46 will be reduced slightly in intensity and lamp 49 will still not be illuminated since point 73 is directly opposite to the commencing point 74 of the resistance at the opposite side of the neutral segment 56. However, as the arm 61 approaches the position in which it is indicated in Fig. 5, commutator arm 66 will have moved to the corresponding position in contact with the resistance 60 and since a substantial amount of resistance is included in the circuit, viz. between the point of contact of arm 66 with the resistance and the point where the lead 59 taps the resistance, it will be obvious that lamp 49 will be illuminated to a degree of substantially minimum intensity. Thus, when the arms 61 and 66 have been rotated half way between the point of tapping the resistance at 59 and the mid-point of the neutral segment 56, an equal amount of resistance will be included in each of the lamp circuits and, therefore, they will be illuminated to the same degree but at a dimmed intensity. As they pass this half way point, lamp 46 is caused gradually to dim while lamp 49 is caused gradually to increase in its intensity of illumination until finally lamp 46 is shut off and lamp 49 is brought to its greatest intensity.

The location of the neutral segment 56 in ring 55 is correlated to the position of the quadrants 42 and 43 of the gear elements 39 and 40, respectively, so that when commutator arm 61 engages the neutral segment 56 and lamp 46 is not illuminated, quadrant 42 will engage gear 34 and reverse the panels 29 to 31. Thus, this is effected when the compartment 23 is in total darkness and the reversal, therefore, cannot be observed through the viewing opening 14. Likewise, quadrant 43 will contact the gear 37 to cause rotation of shaft 33 and reversal of the panels 32 of the platforms 24 to 27 when the quadrant arm 66 is in contact with the neutral segment 46 (a period of about five seconds), thus causing reversal of panels 32 when compartment 24 is in total darkness. Therefore, the displays carried by the platforms 16 to 18 and 24 to 27 are changed when it is not possible to observe one or the other of these units.

Figure 4:
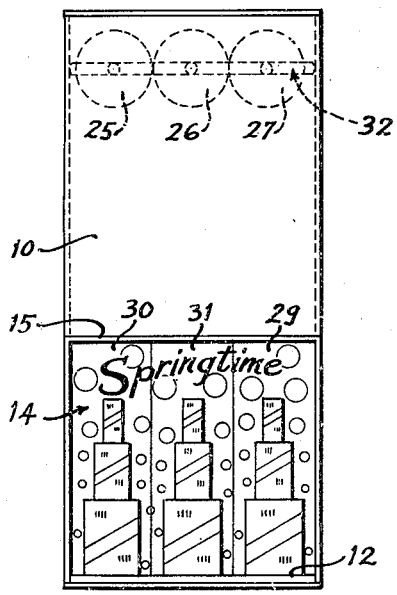
Fig. 4 is a front elevation of the apparatus.

Assuming that a display such as shown in Fig. 4 is carried by the platforms 16 to 18 and that the lamp 46 is illuminated with greatest intensity, then the observer may clearly view the display through the viewing opening 14 and the transparent glass pane 19. At this point, the commutator arm 61 is located diametrically opposite the tapping lead 59 (Fig. 5) and the commutator arm 66 is on the neutral segment 56. Therefore, lamp 49 is not illuminated and compartment 24 is in total darkness. At this point, the quadrant 43 is engaging the gear 37 and, through rotation of shaft 33, is causing reversal of the panels 32 to change the display design to be viewed when compartment 24 is again illuminated with sufficient intensity. As the commutator arm 61 moves clockwise away from proximity to tapping lead 59, the illumination in compartment 23 decreases in intensity and compartment 24 commences to be illuminated very dimly. During this time, the display in compartment 23 as viewed through the opening 14 is still readily discernible clearly.

However, when the arms 61 and 66 rotate to the half way mark to include an equal amount of resistance in the circuits to their lamps 46 and 49, the equal illumination of compartments 24 and 23 will then cause an illusion because the objects displayed before panels 32 in compartment 24 will commence to be reflected in the clear pane of glass 19. Moreover, by reason of the fact that this reflection will coincide with the point that the articles in compartment 23 are viewed, in terms of the vision of the one observing the display, the articles in compartment 24 will in effect be superimposed on the articles displayed in compartment 23. This in fact will gradually start to be the case until it appears to be a fact, at the half way travel of arms 61 and 66 relatively to resistance 60, and then the reverse effect will gradually start to be imposed so that the articles displayed in compartment 24 will commence to dominate, while those in compartment 23 will start to fade away until finally the articles of compartment 23 disappear and the articles in compartment 24 remain sharply defined substantially for a period greater than 5 seconds, the period of time it takes the arm 61 to travel across the extent of the neutral segment 56. During this time, the observer has the illusion of seeing the articles from compartment 24 reflected in the pane 19 as if actually they were in the position corresponding to a mounting on the platforms 16 to 18. This clear-cut reflection is produced by reason of the fact that the compartment 23 is then in total darkness by reason of the lamp 46 being momentarily cut out of circuit. During this period the quadrant 42 engages the gear 34 and the panels 29 are, therefore, reversed to display during the next cycle of operation a different display gradually caused to merge with the display from compartment 24 reflected by the pane 19 and then displayed completely to the exclusion of the display from compartment 24 when the arm 66 finally engages the neutral segment 56 of the ring 55. In this way, therefore, four different displays may be created in alternating sequence, viz. a display in connection with one series of panels, an intermediate reversal of the other series of panels, and their display during reversal of the other series of panels, and so on.

Figure 3:
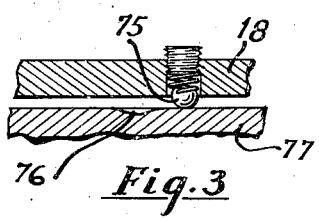
Fig. 3 is an enlarged fragmentary sectional detail of a means for stopping the swinging movement of the panels at a predetermined point.

As the panels are reversed, it is desirable positively to assure that they assume the aligned position necessary to form a complete background, and a means of causing registry of the panels upon reversal may be employed. For instance, one of the platforms 18 (see Fig. 3) may employ a spring-pressed element such as the ball 75 designed to enter into the indentation 76 in a base wall 77 of the casing. Therefore, each time that the panels are reversed, the ball 75 entering the proper indentation 76 will cause the panels to align accurately.

It will be apparent from the foregoing that in combination with a coordinated lighting effect and the pane of glass or other transparent material 19 which will permit vision therethrough, on the one hand, and reflection therefrom, on the other, a changing display of objects or other displays may be created in a somewhat mystifying manner. In such case the panels aligned with one another will form a complete background for the display and, in fact, might be designed to constitute the whole display in itself if desired. In the illustration shown in Fig. 4, articles are mounted on the platforms and displayed in front of the background produced by the panels and which bear reading matter thereon. Obviously the background might consist of reading matter alone if desired.

While a plurality of panels have been shown in conjunction with a plurality of platforms, it is obvious that only one platform might be employed if desired in each of the compartments; whereas if it were only desired to show two displays alternatively, then the effect described might be produced by lighting effect alone.

What I claim as my invention is:

1. In a display apparatus of the class having a cabinet with a viewing opening and two illuminated display compartments, one display compartment being aligned with the viewing opening and the other being disposed at substantially right angles thereto, and a pane of transparent material disposed at an angle in front of said compartments, a means for controlling the illumination in continuous cycle in said display compartments to cause the displays in said compartments to merge and alternate when viewed from the viewing opening comprising a circular member formed from a neutral segment and an arcuate electrical resistor connected to opposed ends thereof, two conducting commutator rings mounted concentrically to said circular member, two commutator arms, one of said arms being adapted to electrically connect one of said rings to said circular member, the other of said arms being adapted to electrically connect the other of said rings to said circular member, said arms being adapted to rotate about said circular member from a common centre of rotation, one being 180° in advance of the other, said circular member being adapted for electrical connection to a source of power at a point spaced one hundred and eighty degrees from said neutral segment, one of said rings being electrically connected with the illuminating means in one of said display compartments, the other of said rings being electrically connected to the illuminating means of the other of said display compartments, the illuminating means in each of said display compartments being adapted to be illuminated through said resistor in said circular member.

2. In a display apparatus of the class having a cabinet with a viewing opening and two illuminated display cabinets with rotating display platforms, one display compartment being aligned with the viewing opening and the other being disposed at substantially right angles thereto, and a pane of transparent material disposed at an angle in front of said compartments, a means for controlling the illumination in continuous cycle in said display compartments to cause the displays in said compartments to merge and alternate when viewed from the viewing opening comprising a rotatable shaft, means for causing said shaft to rotate, a circular member formed from a neutral segment and an arcuate resistor connected to opposed ends thereof, said circular member being mounted concentrically with the axis of rotation of said shaft, two conducting commutator rings mounted concentrically with said circular member, two contact arms secured to said shaft and adapted to rotate therewith, one arm being 180° in advance of the other, one of said arms being adapted to electrically connect one of said rings to said circular member, the other of said arms being adapted to electrically connect the other of said rings to said circular member, said circular member being adapted for electrical connection to a source of power at a point spaced one hundred and eighty degrees from said neutral segment, one of said rings being electrically connected with the illuminating means in one of said display compartments, the other of said rings being electrically connected to the illuminating means of the other of said display compartments, whereby to illuminate the illuminating means in each of said display compartments through said resistor in said circular member, and gear means secured to said rotatable shaft for rotating the display platforms within the display compartments of the display apparatus when the illumination means therefor is extinguished.

3. Display apparatus as claimed in claim 2, in which said gear means secured to said shaft comprise two gear members having toothed quadrants, said apparatus also having further gear means in connection with each of the platforms for rotating them, said quadrants being adapted to engage with said latter mentioned gear means at predetermined points as they rotate to cause said platforms to rotate, one of said toothed quadrants being adapted to rotate the platforms in one of said compartments, the other of said quadrants being adapted to rotate the platforms in the other of said compartments.

JOSEPH PATRICK CASSIDY.

REFERENCES CITED

The following references are of record in the file of this patent:

UNITED STATES PATENTS

| Number | Name | Date |
|---|---|---|
| 1,003,094 | Eastman | Sept. 12, 1911 |
| 1,031,542 | Fielding, Jr. | July 2, 1912 |
| 1,646,706 | Polland | Oct. 25, 1927 |
| 1,842,615 | LaBarrer | Jan. 26, 1932 |
| 1,900,059 | Hayter | Mar. 7, 1933 |
| 2,165,727 | Reymers | July 11, 1939 |

FOREIGN PATENTS

| Number | Country | Date |
|---|---|---|
| 504,019 | Great Britain | Apr. 11, 1939 |